US011402334B2

(12) United States Patent
Laplatine et al.

(10) Patent No.: US 11,402,334 B2
(45) Date of Patent: Aug. 2, 2022

(54) PHOTONIC INTEGRATED CIRCUIT WITH ENCAPSULATED REFERENCE ARM

(71) Applicants: COMMISSARIAT A L'ENERGIE ATOMIQUE ET AUX ENERGIES ALTERNATIVES, Paris (FR); ARYBALLE, Grenoble (FR)

(72) Inventors: Loïc Laplatine, Grenoble (FR); Mathieu Dupoy, Grenoble (FR); Maryse Fournier, Grenoble (FR); Pierre Labeye, Grenoble (FR); Thierry Livache, Jarrie (FR); Cyril Herrier, Fontaine (FR)

(73) Assignees: COMMISSARIAT A L'ENERGIE ATOMIQUE ET AUX ENERGIES ALTERNATIVES, Paris (FR); ARYBALLE, Grenoble (FR)

( * ) Notice: Subject to any disclaimer, the term of this patent is extended or adjusted under 35 U.S.C. 154(b) by 198 days.

(21) Appl. No.: 16/903,327

(22) Filed: Jun. 16, 2020

(65) Prior Publication Data
US 2020/0400883 A1    Dec. 24, 2020

(30) Foreign Application Priority Data
Jun. 21, 2019   (FR) ...................................... 1906736

(51) Int. Cl.
*G01N 21/77* (2006.01)
*G01N 21/41* (2006.01)
(Continued)

(52) U.S. Cl.
CPC ......... *G01N 21/7703* (2013.01); *G01N 21/41* (2013.01); *G01N 21/45* (2013.01);
(Continued)

(58) Field of Classification Search
None
See application file for complete search history.

(56) References Cited

U.S. PATENT DOCUMENTS

| 4,515,430 | A | | 5/1985 | Johnson | |
|---|---|---|---|---|---|
| 4,940,328 | A | * | 7/1990 | Hartman | ............ G01R 29/0885 |
| | | | | | 385/12 |

(Continued)

FOREIGN PATENT DOCUMENTS

| EP | 0 340 577 A2 | | 11/1989 | |
|---|---|---|---|---|
| GB | 2307741 A | * | 6/1997 | ............. G01N 21/41 |

(Continued)

OTHER PUBLICATIONS

Melnik, et al., "Local functionalization of CMOS-compatible Si3N4 Mach-Zehnder interferometers with printable functional polymers", Sensors and Actuators B: Chemical, vol. 236, pp. 1061-1068, May 28, 2016.

(Continued)

*Primary Examiner* — Michelle R Connelly
(74) *Attorney, Agent, or Firm* — BakerHostetler

(57) ABSTRACT

A photonic integrated circuit for an interferometric sensor includes a first waveguide called sensitive arm wherein a first portion of the light radiation is propagated, the sensitive arm being exposed to a first ambient medium and to at least one compound to be detected inducing a modification of the local refractive index perceived by the evanescent part of the electromagnetic field of the first portion of the light radiation, and a second waveguide called reference arm wherein a second portion of the light radiation is propagated, an encapsulation layer encapsulating the reference arm, the encapsulation layer being impermeable to the compound or compounds to be detected, so that the reference arm is exposed only to a second ambient medium, substantially of the same nature as the first ambient medium and without the (Continued)

compound to be detected and interferometric sensor comprising a photonic integrated circuit according to the invention.

14 Claims, 8 Drawing Sheets

(51) Int. Cl.
| | | |
|---|---|---|
| *G01N 21/45* | (2006.01) | |
| *G02B 6/122* | (2006.01) | |
| *G02B 6/12* | (2006.01) | |
| *G02B 6/124* | (2006.01) | |

(52) U.S. Cl.
CPC ............ *G01N 2021/458* (2013.01); *G01N 2021/7779* (2013.01); *G01N 2201/08* (2013.01); *G01N 2201/0873* (2013.01); *G02B 6/122* (2013.01); *G02B 6/124* (2013.01); *G02B 2006/1215* (2013.01); *G02B 2006/12107* (2013.01); *G02B 2006/12138* (2013.01); *G02B 2006/12159* (2013.01)

(56) References Cited

U.S. PATENT DOCUMENTS

| | | | | |
|---|---|---|---|---|
| 5,262,842 A | * | 11/1993 | Gauglitz | G01N 21/45 |
| | | | | 356/477 |
| 5,917,966 A | * | 6/1999 | Beuhler | G01N 21/77 |
| | | | | 385/12 |
| 6,766,071 B2 | * | 7/2004 | Whateley | G01N 21/45 |
| | | | | 385/12 |
| 9,671,335 B2 | * | 6/2017 | Bienstman | G01N 21/45 |
| 2004/0239944 A1 | * | 12/2004 | Shirai | G01N 21/7703 |
| | | | | 356/481 |
| 2008/0101744 A1 | * | 5/2008 | Keyser | G01N 21/7703 |
| | | | | 385/12 |
| 2020/0386681 A1 | * | 12/2020 | Hoste | G01N 21/45 |
| 2021/0181103 A1 | * | 6/2021 | Furuya | G02B 6/125 |

FOREIGN PATENT DOCUMENTS

| | | | | |
|---|---|---|---|---|
| JP | 2011107071 A | * | 6/2011 | |
| WO | WO-2011157766 A1 | * | 12/2011 | ............ G01N 21/00 |

OTHER PUBLICATIONS

Muellner, et al., "CMOS-compatible Si3N4 waveguides for optical biosensing", Procedia Engineering, vol. 120 pp. 578-581, 2015.

Densmore, et al., "Arrays of SOI photonic wire biosensors for label-free molecular detection", SPIE, Proceedings, vol. 7606, Feb. 11, 2010.

González-Guerrero, et al., "Advanced photonic biosensors for point-of-care diagnostics", Procedia Eng., vol. 25, pp. 71-75, 2011.

* cited by examiner

PHOTONIC INTEGRATED CIRCUIT WITH ENCAPSULATED REFERENCE ARM

CROSS-REFERENCE TO RELATED APPLICATIONS

This application claims priority to foreign French patent application No. FR 1906736, filed on Jun. 21, 2019, the disclosure of which is incorporated by reference in its entirety.

FIELD OF THE INVENTION

The present invention relates to the field of optical interferometry and, more particularly, to interferometric sensors for measuring gases and for biological measurements.

BACKGROUND

In the fields of biology, medicine, air quality monitoring, gas detection or, more generally, monitoring the quality of odorous or non-odorous materials, there is a great need for techniques that are rapid, economical and accurate for the detection of compounds in aqueous or gaseous media.

Chemical sensors and biosensors make it possible to obtain a rapid detection and a real-time monitoring of the interaction between the sample or the compounds to be detected and the sensor. Such sensors use a chemical or biomolecular detection layer in order to recognise a compound to be detected by binding it therewith. This layer can, for example, comprise molecules such as antibodies, enzymes, hormones, DNA, neurotransmitting receptors, etc.

This type of sensor cannot generally be reused because the step of binding between the compound to be detected and the detection layer is generally not reversible. These sensors are therefore used once and then disposed of. However, other types of sensors, such as electronic tongues or noses, can be reused very many times.

The photonic integrated sensors provide an attractive pathway for these chemical sensors. In fact, the techniques for manufacturing waveguides integrated on optical chips by photolithography and micromanufacturing allow for an inexpensive and repeatable mass production of sensors in integrated optics. Most of these sensors in integrated optics are interferometers of Mach-Zehnder type (or MZI, for Mach-Zehnder interferometer). FIG. 1A schematically illustrates the principle of such an interferometer. An incident beam $L_{in}$ is coupled to an interferometric sensor Capt and directed, by a Y splitter, to two waveguides: a reference arm and a sensitive arm. The intensity $I_t$ of the transmitted beam $L_{out}$ is:

$$I_t(t) = I_s(t) + I_r(t) + 2\sqrt{I_s I_r(t)} \cos(\Delta\phi_s(t)) \quad \text{[Math 1]}$$

with Is and Ir which are the intensities transmitted by the sensitive arm and the reference arm, respectively. The phase-shift is created by a difference in optical tread between the two arms which can be written in the form:

$$\Delta\phi_s(t) = (2\pi/\Delta) \times [L_s \times (n_{eff\text{-}s} + \Delta n_{eff\text{-}s}(t)) - L_r \times n_{eff\text{-}r}] \quad \text{[Math 2]}$$

in which $L_s$ and $L_r$ are the physical lengths of the sensitive arm and of the reference arm, respectively, and in which $n_{eff\text{-}s}$ and $n_{eff\text{-}r}$ are the effective optical indices of the sensitive arm and of the reference arm, respectively. In the simplest case in which the two arms have the same length, the same initial effective index, and in which the transmitted intensities are the same, then $I_t$ is proportional to $\cos[(2\pi/\Delta) \times L \times \Delta n_{eff\text{-}s}(t)]$. The intensity therefore varies if the effective optical index of the sensitive guide varies, and the sensitivity of the MZI is proportional to the length of the sensitive arm. This is why most MZIs use spiral-form waveguides as reference arm and sensitive arm, as FIG. 1B illustrates. Compared to the straight waveguides, the spiral-form waveguides make it possible to have arms of a greater length and therefore to obtain a high sensitivity while reducing their bulk. FIG. 1B also illustrates a Y splitter Sy that makes it possible to direct the radiation $L_{in}$ to the sensitive arm and the reference arm and a Y combiner Cy that makes it possible to obtain a radiation $L_{out}$ from the coupling of the radiations guided by the sensitive arm and by the reference arm.

For example, it is known practice for producing sensors in interferometric integrated optics of Mach-Zehnder type to perform air temperature measurements (U.S. Pat. No. 4,515,430). It is also known practice to produce sensors in interferometric integrated optics of Mach-Zehnder type with a reference arm covered by a superstrate and a sensitive arm exposed to an ambient liquid medium, said sensor making it possible to measure the refractive index of the medium (EP 340 577).

FIG. 1A illustrates an example of an integrated optical MZI sensor Capt. Generally, these MZI sensors in integrated photonics have their reference arm (BR) covered by a top layer called superstrate or "cladding" (of oxide or of resin), while the sensitive arm (BS) is exposed to the medium in which the detection takes place. Since the refractive index of the superstrate is not generally similar to that of the medium to which the sensitive arm is exposed, the radiation guided in the sensitive arm does not suffer the same propagation losses as the radiation guided in the reference arm. This difference in index, if it is not compensated, will induce a measurement noise. This type of interferometer is generally called "non-symmetrical", because the two arms of the interferometer do not have the same optical length (group index multiplied by the length of the arm).

A functionalization layer deposited on top of the sensitive arm and at least partially covering the latter allows for an adsorption of specific compounds (see FIG. 1A) in the functionalization layer. Note that the waveguide is sensitive only to the variations of indices occurring at distances less than a few hundreds of nm, that is to say within the zone in which the field is evanescent, and penetrates slightly outside of the guide itself in the ambient medium. Because of this, if molecules come to be adsorbed on the surface of the guide, and their optical index is different from that of the ambient medium, they will induce a change of index, and therefore a phase shift and a measurable variation of intensity. It can be shown that the quantity of molecules adsorbed is, as a first approximation, proportional to their concentration (Cn) in the ambient medium. Thus, as FIG. 1A shows, the intensity at the output of the MZI varies sinusoidally with the concentration of molecules.

The two waveguides, reference arm and sensitive arm, therefore have different optical properties, notably their effective index $n_{eff}$, their susceptibility to temperature $\partial n_{eff}/\partial T$ and their group index $n_g$. Even if the sensitive and reference guides have the same physical dimensions (width, height, length, curvature, etc.), the MZI will be neither athermal nor wideband, which means that the temperature and/or wavelength variations will induce a spurious signal (measurement noise) that is uncorrelated with the index variations that are sought to be measured. This measurement noise will be all the stronger when the MZI is long.

It is however possible to make the MZI athermal if the length ratio between the sensitive arm and the reference arm is such that:

$$\frac{\partial n_1}{\partial T} \cdot L_1 - \frac{\partial n_2}{\partial T} \cdot L_2 = 0 \Rightarrow \frac{L_2}{L_1} = \frac{\frac{\partial n_{\text{eff},1}}{\partial T}}{\frac{\partial n_{\text{eff},2}}{\partial T}} \quad [\text{Math 3}]$$

with index 1 for the reference arm and index 2 for the sensitive arm.

It is also possible to make it wideband if the length ratio is such that its free spectral range ("FSR", which represents the bandwidth of the interferometric device) become infinite:

$$FSR = \frac{\lambda^2}{n_{g,1} \cdot L_1 - n_{g,2} \cdot L_2} \to +\infty \Rightarrow n_{g,1} \cdot L_1 - n_{g,2} \cdot L_2 \quad [\text{Math 4}]$$

$$= 0 \Rightarrow \frac{L_2}{L_1}$$

$$= \frac{n_{g,1}}{n_{g,2}}$$

Since $\partial n_{\text{eff}}/\partial T$ and $n_g$ are functions of the width ($w_1$, $w_2$) and height (H1, H2) of the guide, and of the wavelength, the MZI can be made both athermal and wideband, around a wavelength and for a given nominal guide height, for a pair of widths $\{w_1, w_2\}$ and of lengths ($L_1$, $L_2$) which satisfy these two equations.

The equation [Math 2] means that the longer the sensitive arm of the MZI becomes, the greater will be its sensitivity. However, the longer the sensitive arm of the MZI becomes the more significant will be the variation in the production of the waveguides (height and width). This variation will therefore impact the conditions to be observed that are defined in the equations [Math 3] and [Math 4] for the MZI to be athermal and wideband. There is therefore a trade-off between the sensitivity of the MZI in terms of index variation that is desired to be as great as possible and which is proportional to the length of the sensitive arm, and on its performance levels, that are wanted to be as stable as possible from one MZI to another.

It is known practice to produce MZI sensors that are symmetrical, that is to say in which the reference arm, just like the sensitive arm, is not covered with a superstrate, the arms having the same effective index, the same length, the same height and the same width. In this case, the reference arm is "passivated" chemically (A. B. Gonzalez-Guerrero, S. Dante, D. Duval, J. Osmond, and L. M. Lechuga, "Advanced photonic biosensors for point-of-care diagnostics," Procedia Eng., vol. 25, pp. 71-75, 2011.). Thus, the two arms will be subjected to exactly the same ambient medium. This structure makes it possible to compensate for the global index variations and non-specific adsorption phenomena corresponding to molecules in the ambient medium which are not those that are sought to be detected and which can be adsorbed in the sensitive arm and in the reference arm. However, the passivation is never perfectly insensitive to all the target molecules that are sought to be detected. Furthermore, this passivation evolves over time, which changes the sensitivity of the MZI and the detection/identification signatures.

SUMMARY OF THE INVENTION

The invention aims to overcome certain problems of the prior art. To this end, one subject of the invention is a symmetrical photonic integrated circuit comprising a reference arm encapsulated in a medium of the same nature as that to which the sensitive arm is exposed during detection.

To this end, one subject of the invention is a photonic integrated circuit for an interferometric sensor comprising:
a bottom layer called substrate;
a first coupling means suitable for coupling an incident light radiation to the photonic integrated circuit;
a directional splitter linked to the first coupling means and configured to split the light radiation coupled by the first coupling means to at least one couple of waveguides comprising:
a first waveguide called sensitive arm in which a first portion of the light radiation is propagated, said sensitive arm being exposed to a first ambient medium and to at least one compound to be detected inducing a modification of the local refractive index perceived by the evanescent part of the electromagnetic field of the first portion of the light radiation, and
a second waveguide called reference arm in which a second portion of the light radiation is propagated,
an encapsulation layer encapsulating the reference arm, said encapsulation layer being impermeable to the compound or compounds to be detected, so that the reference arm is exposed only to a second ambient medium, substantially of the same nature as the first ambient medium and without said compound to be detected;
a directional combiner combining the first portion of the light radiation from said reference arm, called first transmitted portion, and the second portion of the light radiation from said sensitive arm, called second transmitted portion, to form a transmitted radiation;
a second coupling means suitable for coupling said transmitted radiation to a medium external to the photonic integrated circuit;
a top layer called superstrate covering at least the first and the second coupling means, the directional splitter and the directional combiner and not covering the sensitive arm and the reference arm, said encapsulation layer being deposited on top of the superstrate.
According to particular embodiments of the invention:
the sensitive arm and the reference arm are spiral-form waveguides;
the photonic integrated circuit comprises a so-called functionalization layer at least partially covering the sensitive arm and suitable for adsorbing one of the compounds to be detected;
the photonic integrated circuit comprises a so-called compensation layer at least partially covering the reference arm, a thickness of the compensation layer being equal to or greater than that of the functionalization layer before adsorption of said compound to be detected;
the encapsulation layer is porous to the first ambient medium so as to allow a regulation of the relative humidity or of the osmotic pressure of the second ambient medium relative to the first ambient medium;
the encapsulation layer is made of glass, or silicon, polymer or metal;
the encapsulation layer is a deformable membrane;
an assembly formed by said directional splitter, said reference arm, said encapsulation layer, said sensitive arm and said directional combiner is called interferometric assembly, said photonic integrated circuit further comprising at least one additional directional splitter configured to split the light radiation coupled by the first coupling means to a plurality of interferometric assemblies, and comprising a plurality of second coupling means, each suitable for coupling the radiation transmitted by a different interferometric assembly to a medium external to the photonic integrated circuit;

the sensitive arm of each interferometric assembly comprises a so-called functionalization layer at least partially covering the sensitive arm and suitable for adsorbing one of the compounds to be detected, each functionalization layer being adapted to adsorb a compound to be detected that is different from those adsorbed by the other functionalization layers covering the sensitive arm of the other interferometric assemblies;

the reference arm of each interferometric assembly is individually encapsulated;

the thickness of the individual encapsulation layer is less than 500 microns;

the reference arms of the interferometric assemblies are collectively encapsulated, so as to form an encapsulation layer that is uniform and without discontinuity;

the thickness of the individual encapsulation layer lies between 5 microns and 2000 microns.

Another subject of the invention is a sensor comprising:
a laser source configured to emit an incident light radiation;
a photonic integrated circuit according to the invention;
an optical detection system suitable for detecting a light radiation from the second coupling means and generating a signal representative of the trend over time of the detected light intensity;
a processing unit for processing said signal, suitable for determining, from the detected intensity, the trend over time of the phase-shift between the first transmitted portion and the second transmitted portion.

BRIEF DESCRIPTION OF THE DRAWINGS

Other features, details and advantages of the invention will become apparent from reading the description given with reference to the attached drawings given by way of example and which represent, respectively.

The references in the figures, when they are identical, correspond to the same elements.

In the figures, unless indicated otherwise, the elements are not to scale and the axes (x,y,z) form a direct orthonormal reference frame.

DETAILED DESCRIPTION

Figure 2A:
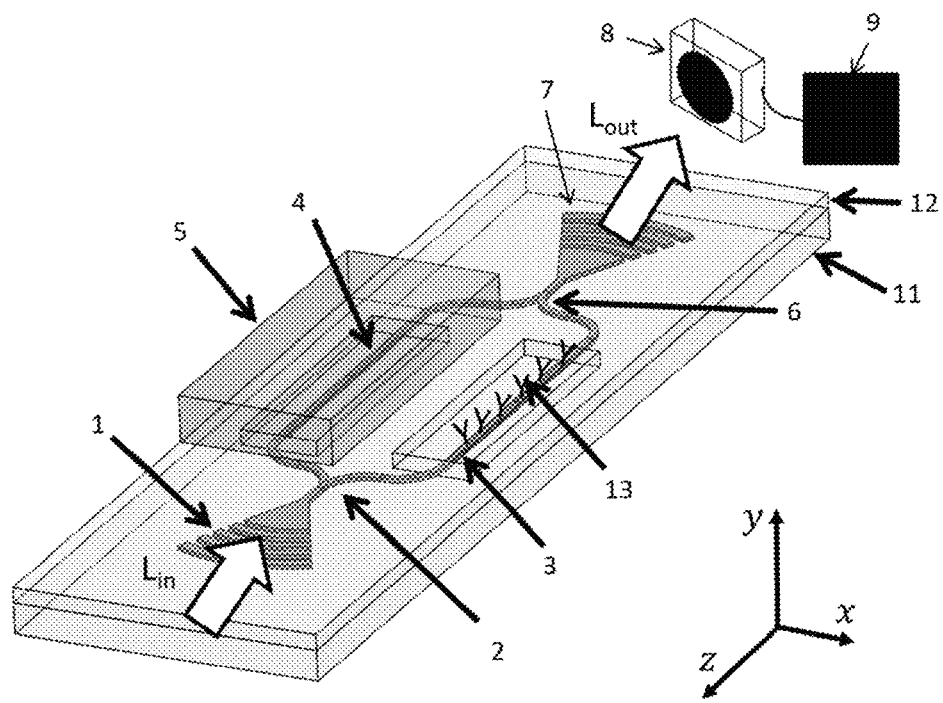
FIG. 2A and FIG. 2B, respectively, a perspective view and profile view of a photonic integrated circuit of the invention.
Figure 2B:
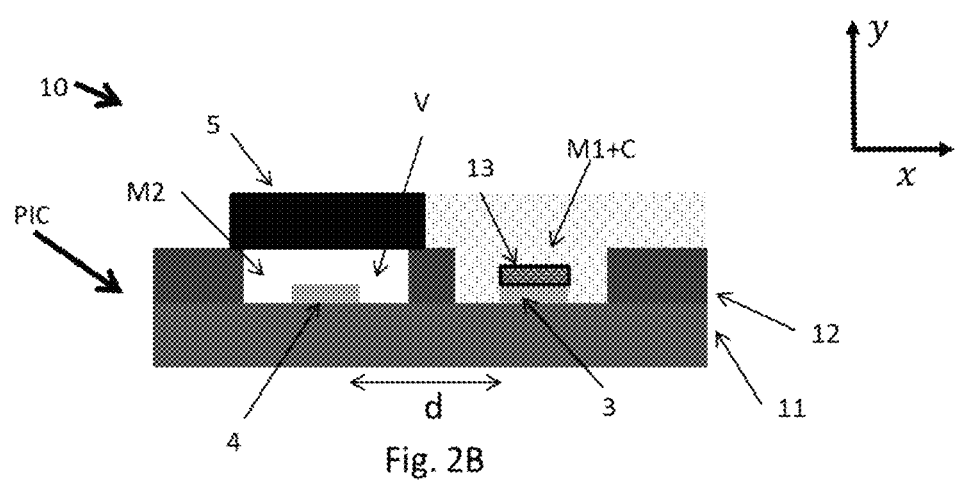

FIG. 2A and FIG. 2B respectively represent a perspective view and a cross-sectional view of a photonic integrated circuit PIC according to the invention for a Mach-Zehnder interferometric sensor. The photonic integrated circuit PIC comprises a bottom layer called substrate 11 on top of which are situated all the elements of the photonic integrated circuit. Furthermore, the photonic integrated circuit comprises a top layer called superstrate 12 covering all the elements, except when specified.

The photonic integrated circuit comprises a first coupling means 1 suitable for coupling an incident light radiation $L_{in}$ emitted by a laser source—not represented in the FIGS. 2A and 2B—and being propagated in free space or in an optical fibre to a waveguide of the photonic integrated circuit PIC. According to one embodiment, the waveguides of the photonic integrated circuit operate with TM polarization. Alternatively, the waveguides of the photonic integrated circuit operate with TE polarization.

According to one embodiment of the invention, this first coupling means 1 is a diffraction grating. Alternatively, in another embodiment, this first coupling means is a direct (axial) coupler coupling a fibre to a straight guide ("edge coupling" or "butt coupling"). The diffraction grating makes it possible to facilitate the alignment with a source emitting the light radiation $L_{in}$.

The light radiation coupled by the first coupling means 1 to a waveguide of the photonic integrated circuit is directed to a directional splitter 2 linked to the first coupling means 1. According to one embodiment of the invention, the splitter is a Y splitter.

The splitter is configured to split the light radiation $L_{in}$ coupled by the first coupling means 1 to at least one first pair of waveguides, formed by a first waveguide called sensitive arm 3 in which a first portion of the light radiation is propagated and a second waveguide called reference arm 4 in which a second portion of the light radiation is propagated.

According to one embodiment of the invention, the reference arm and the sensitive arm are raised or "ridge" waveguides relative to the substrate 11.

Alternatively, in another embodiment, the reference arm and the sensitive arm are waveguides buried in the substrate 11. In this embodiment, the waveguides are not therefore situated above the substrate 11.

Alternatively, in another embodiment, the reference arm and the sensitive arm are waveguides of "rib" type.

According to one embodiment of the invention, the sensitive arm and the reference arm are spiral-form waveguides. That makes it possible to have arms of a greater length and therefore obtain a high sensitivity (see equation [Math 2]), while reducing their bulk. Alternatively, the sensitive arm and the reference arm are straight waveguides.

The sensitive arm and the reference arm are not covered by the superstrate 12 and have the same length, the same width, the same height and have the same effective index.

The sensitive arm is exposed to a given first ambient medium M1 and to at least one compound to be detected C able to be adsorbed in the sensitive arm so as to induce a modification of the local refractive index perceived by the evanescent part of the electromagnetic field of the first portion of the light radiation and thus provoking a modification of the effective index of the sensitive arm $\Delta n_{eff,s}$ (see Math 2).

The reference arm is encapsulated using an encapsulation layer 5 that is impermeable to the compound or compounds to be detected C present in the first ambient medium, so as to be exposed only to a second ambient medium M2, of the same nature or substantially the same nature as the first ambient medium M1, but without the compound to be detected C. Medium of the same nature is understood here to mean that, when the medium M1 is air, the medium M2 is air; when the medium M1 is water, the medium M2 is water; when the medium M1 is a particular fluid, the medium M2 is the same fluid, etc. In concrete terms, the encapsulation layer 5 is deposited on top of the superstrate 12 sealing a volume V, so as to control the environment to which the reference arm 4 is exposed and to isolate the latter from the compounds to be detected C.

The adsorption of the compound to be detected on the surface of the waveguide, with an optical index different from that of the ambient medium, induces a change of index perceived by the evanescent part of the field TM guided in the sensitive arm. This change of index is reflected by a phase-shift between the first portion of the light radiation and the second portion of the light radiation. As mentioned previously, it can be shown that the quantity of molecules adsorbed is, as a first approximation, proportional to their concentration in the ambient medium M1.

According to a preferred embodiment of the invention, the photonic integrated circuit of the invention comprises a so-called functionalization layer 13, which is optional, covering the sensitive arm and suitable for adsorbing one of the compounds to be detected on the surface of this layer. Surface of the layer is understood here to mean the face of the layer in contact with the ambient medium M1 and the compound to be detected. This layer allows for a more effective adsorption of the compound to be detected on the surface of the functionalization layer.

Alternatively, according to another embodiment, the interferometric sensor does not comprise a functionalization layer 13.

The photonic integrated circuit PIC also comprises a directional waveguide combiner or coupler 6 combining the first portion of the light radiation from the reference arm, called first transmitted portion, and the second portion of the light radiation from said sensitive arm, called second transmitted portion, to form a transmitted radiation. The transmitted radiation is directed to a second coupling means 7 suitable for coupling the transmitted radiation to a medium external to the photonic integrated circuit. According to one embodiment of the invention, the combiner 6 is a Y combiner.

According to one embodiment of the invention, this second coupling means is a diffraction grating. Alternatively, in another embodiment, this second coupling means is a direct (axial) coupler coupling a fibre to a straight guide ("edge coupling" or "butt coupling").

Hereinbelow, the assembly formed by said directional splitter 2, said reference arm 4, said encapsulation layer 5, said sensitive arm 3 and said directional combiner 6 will be called interferometric assembly.

The photonic integrated circuit PIC according to the invention is intended to be associated with the laser diode laser source or SLED (not represented), with an optical detection system 8 and with a processing unit 9 so as to form an interferometric sensor 10. The optical detection system is suitable for detecting the light radiation from the second coupling means $L_{out}$ and being propagated in free space or in an optical fibre. The optical detection system is suitable for generating a signal S representative of the trend over time of the detected light intensity $I_t(t)$ resulting from the interference between the first transmitted portion and the second transmitted portion. According to one embodiment of the invention, this optical detection system is a photodiode.

The optical detection system 8 is coupled to a processing unit for processing the signal generated by the detection system 9 suitable for determining, from the detected intensity $I_t(t)$, the trend over time of the phase shift $\Delta\phi(t)$ between the first transmitted portion and the second transmitted portion. This phase shift $\Delta\phi(t)$ makes it possible to determine the trend of the concentration of the compound to be detected over time, in the ambient medium M1. In fact, the quantity of molecules C adsorbed in the sensitive arm—and therefore the modification of index $\Delta n_{eff,s}$ that this adsorption induces—is approximately proportional to their concentration in the ambient medium M1. This modification of refractive index is perceived by the evanescent part of the electromagnetic field of the first portion of the light radiation in its propagation in the sensitive arm and will therefore result in a phase shift $\Delta\phi(t)$ between the first transmitted portion and the second transmitted portion. Thus, the detected intensity $I_t(t)$ varies sinusoidally with the concentration of the compound to be detected.

Since the reference arm and the sensitive arm of the integrated circuit according to the invention are exposed to the same ambient medium, the propagation losses in each arm are identical. That makes it possible to maximize the contrast of the interference between the first transmitted portion and the second transmitted portion. Furthermore, the fact that the two arms are covered by ambient media of the same nature—therefore of very similar refractive indices—means that the interferometric sensor 10 has an intrinsically athermal and wideband design, independently of the average value of the height and of the width of the sensitive arm and reference arm waveguides. The photonic integrated circuit PIC according to the invention, in the interferometric sensor 10, allows for a detection of compounds to be detected both in a gas and in a liquid.

Also, according to one embodiment, the ambient media M1 and M2 are both air or another carrier gas. In this embodiment, the compounds to be detected C are gaseous molecules or volatile organic compounds.

Alternatively in another embodiment, the ambient media M1 and M2 are both an aqueous medium. In this other embodiment, the compounds to be detected are for example biomolecules.

It is important to note that the encapsulation of the reference arm means that the ambient medium M1 in contact with the sensitive arm can undergo global variations (pressure, humidity for example) while the ambient medium M2 in contact with the reference arm does not undergo any variation. Thus, these variations of the ambient medium M1 will not be compensated by the interferometric sensor and will induce a spurious signal uncorrelated to the variations of indices, thus reducing the sensitivity of the measurement. Also, in one embodiment, the encapsulation layer can be a membrane that is thin and flexible enough to allow a deformation of this membrane upon a variation of overall pressure of the ambient medium M1. The deformation of the encapsulation layer thus makes it possible to obtain an equalization of the pressure of the ambient medium M2 relative to the pressure of the ambient medium M1. In order to be able to be deformed appropriately, the encapsulation layer can be made of polymer, resin, glass, silicon, metal, and have a thickness that is thin enough to be able to be deformed easily under the effect of a pressure differential, but that is thick enough not to break or collapse, typically of the order of a few tens of nanometres to a few micrometres. This embodiment is advantageous because a variation of the overall pressure of the ambient medium M1 will result in a modification of its refractive index, which, when it is not compensated in the medium M2, will result in a phase shift between the radiation guided in the sensitive arm relative to the radiation guided in the reference arm, producing a measurement noise on the phase shift measured by the sensor. Thus, this embodiment makes it possible to at least partially overcome this spurious signal produced by a pressure variation of the ambient medium M1.

In one embodiment, the encapsulation layer 5 is partially porous to the first ambient medium M1 so as to allow a regulation of the relative humidity (in the case where the ambient media are gaseous) or of the osmotic pressure (in the case where the ambient media are aqueous) of the second ambient medium relative to the first ambient medium. The porosity of the encapsulation layer thus makes it possible to obtain, in some situations, an equalization of the relative humidity or of the osmotic pressure of the ambient medium M2 relative to the relative humidity or to the osmotic pressure of the ambient medium M1. Like a pressure variation, a variation of the relative humidity or of the presence of an element in the ambient medium M1 will result in a modification of its refractive index, which, when it is not compensated in the medium M2, will result in a phase shift between the radiation guided in the sensitive arm relative to the radiation guided in the reference arm, producing a measurement noise on the phase shift measured by the sensor. Thus, this embodiment makes it possible to at least partially overcome this spurious signal. In this embodiment, the encapsulation layer can be of DuPont™ Nafion® or other membrane permeable to moisture and has a thickness that is as thin as possible, but that is sufficient not to break or collapse under the action of a pressure differential. In one embodiment, the thickness of this membrane lies between a few tens of nanometres and a few micrometres.

The encapsulation layer can be deposited and bonded on top of the superstrate by a method chosen from among the following: anodic bonding, molecular bonding, adhesive polymer bonding and eutectic bonding.

Anodic bonding and molecular bonding do not require glue and make it possible to obtain a very strong mechanical strength. However, these techniques are complex to implement because they require ultra-clean and ultra-smooth surfaces and high temperatures (greater than 120° C.) potentially affecting certain types of functionalization of the sensitive arm. The rise in temperature therefore dictates materials to be bonded that have similar thermal expansion coefficients. Furthermore, the anodic bonding requires one of the two faces to be of silicon and the other to be of glass which contains sodium oxide.

Eutectic bonding offers a very strong mechanical strength and is more tolerant to the flatness and the cleanliness of the surfaces to be bonded than anodic or molecular bonding. Furthermore, it makes it possible to obtain an excellent hermetic seal. It does however demand one of the two faces to be covered by a metal (typically gold) and the other to be covered with silicon in order for the silicon and the metal to create an alloy, and requires high temperatures (greater than 150° C.) potentially affecting certain types of functionalization.

Adhesive bonding is highly tolerant to the flatness and the cleanliness of the surfaces to be bonded and can be performed at ambient temperature. This bonding does not impose restrictions on the thermal expansion coefficients and has no effect on the functionalization of the sensitive arm. It therefore makes it possible to bond very different materials and offers a satisfactory mechanical strength. However, it does require one of the two faces to be covered with a cross-linkable polymer and the hermetic seal obtained is less good than for the other bonding methods.

In one embodiment, in order to facilitate the bonding of the encapsulation layer, a layer of silicon is deposited below the encapsulation layer and on top of the superstrate, the encapsulation layer then being bonded to said layer of silicon.

Figure 1A:
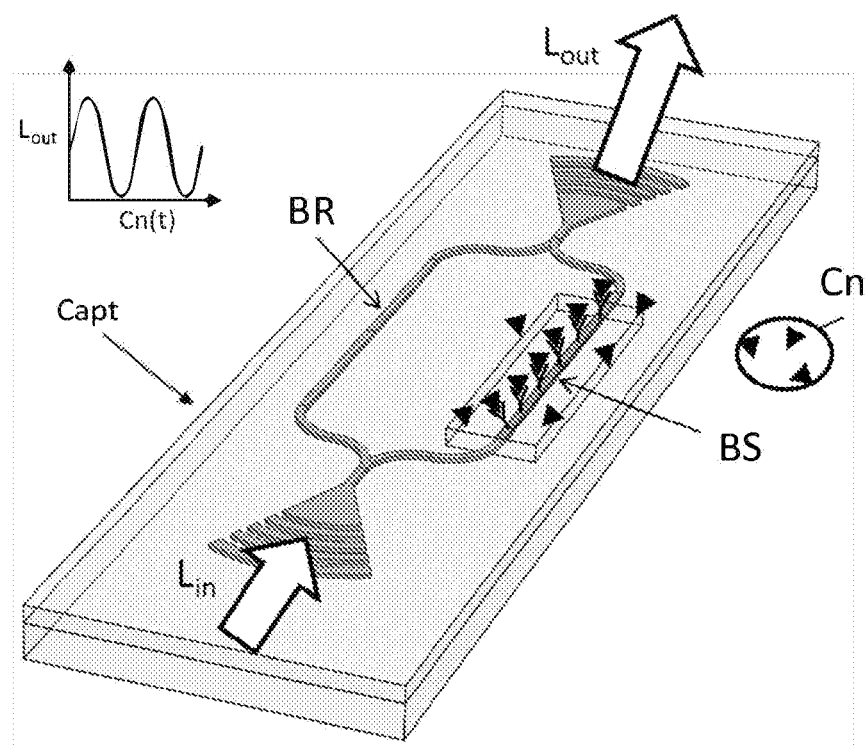
FIG. 1A a schematic view of a Mach-Zehnder interferometric sensor in integrated optics of the prior art.
Figure 1B:
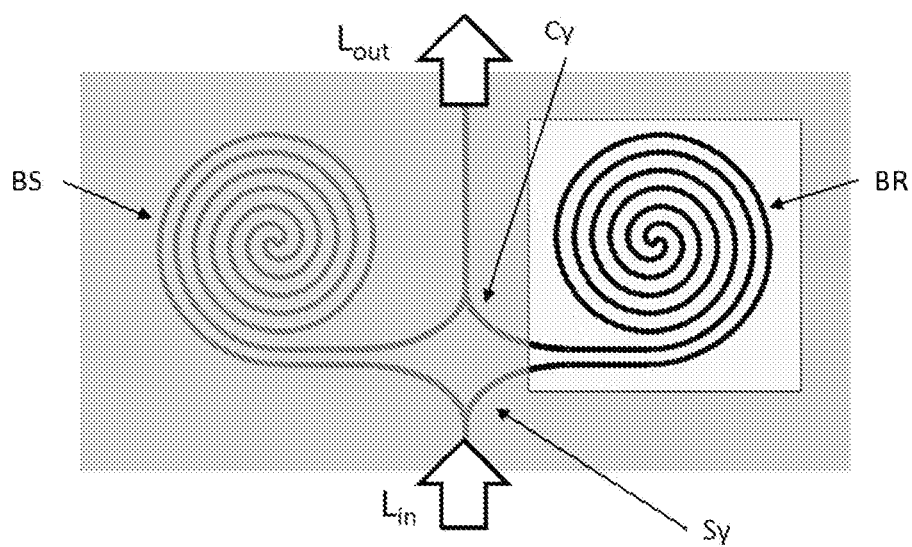
FIG. 1B a schematic view of a Mach-Zehnder interferometric sensor in integrated optics of the prior art with a sensitive arm and a reference arm in spiral form.
Figure 3A:
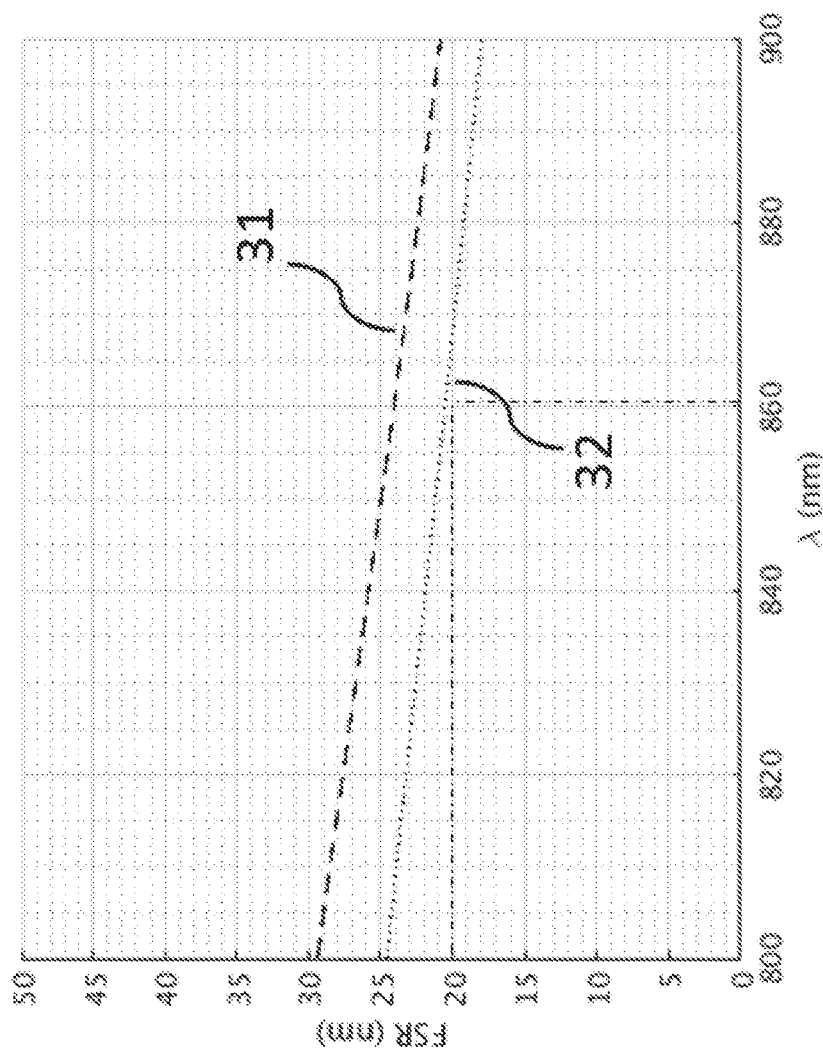
FIG. 3A and FIG. 3B, calculation of the FSR as a function of the wavelength for guide width and height variations, for, respectively, a symmetrical interferometric sensor comprising the photonic integrated circuit according to the invention and for the non-symmetrical Mach-Zehnder interferometric sensor of FIG. 1.
Figure 3B:
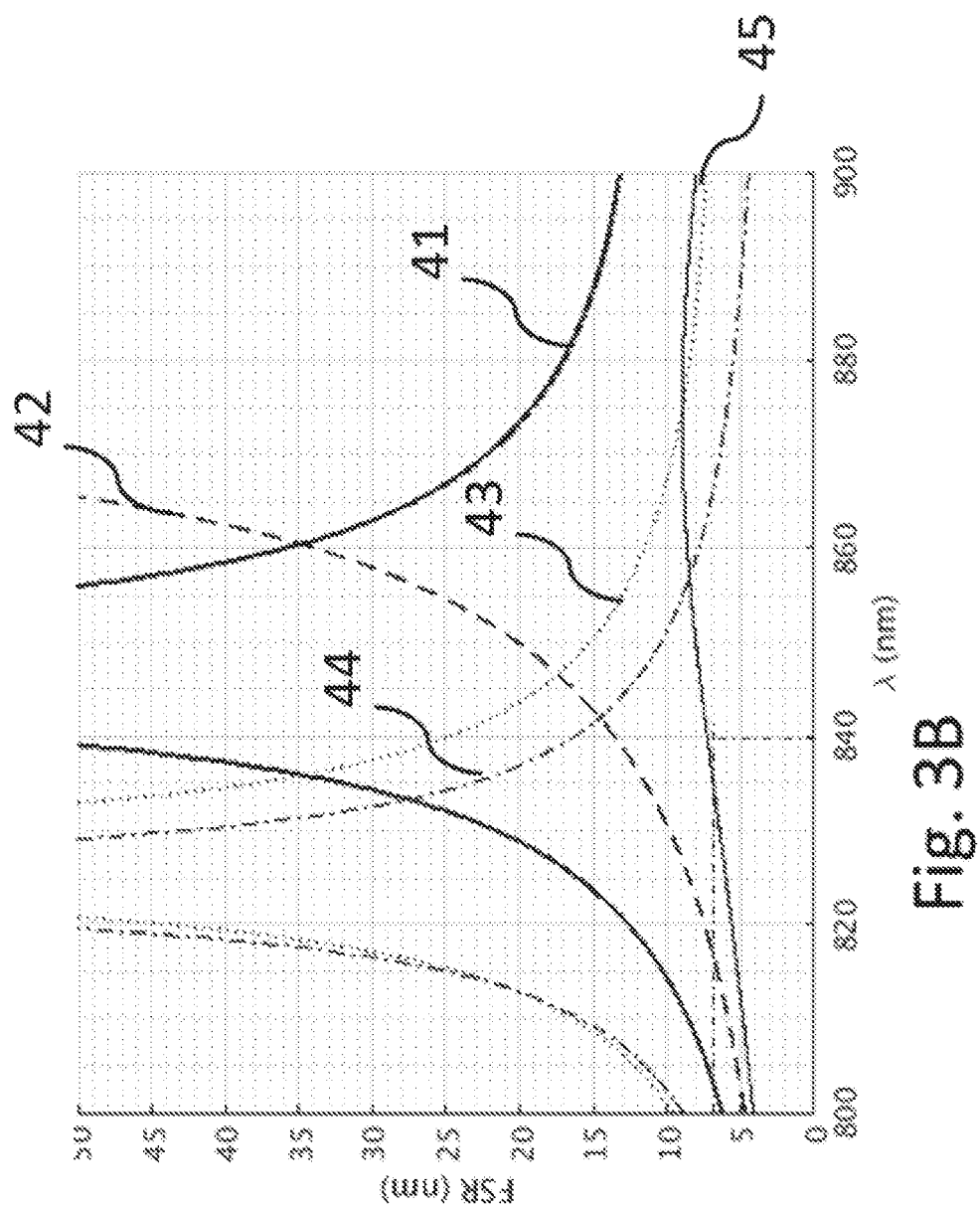

FIGS. 3A and 3B respectively illustrate the calculation of the FSR as a function of the wavelength for guide width and height variations, for a symmetrical interferometric sensor comprising the photonic integrated circuit of the invention (that will be called MZI according to the invention) and for the non-symmetrical Mach-Zehnder interferometric sensor of FIG. 1 (that will be called non-symmetrical MZI). The FSR makes it possible to represent the bandwidth of the interferometric sensor.

In the example of FIGS. 3A and 3B, given in a nonlimiting manner, the polarization of the radiation guided in the waveguides of the two sensors is a TM polarization. Furthermore, in order to be athermal and wideband, the non-symmetrical MZI has waveguides with a nominal height (or thickness) of $H_{nominal}=H_{2,nominal}=H_{1,nominal}=250$ nm and a nominal width of $W_{2,nominal}=760$ nm and $W_{1,nominal}=420$ nm, for the sensitive arm and the reference arm respectively. The sensitive arm has a length $L_{sens}=10$ mm.

The MZI according to the invention, for its part, has identical arms, with a nominal height and width of $H_{nominal}=H_{2,nominal}=H_{1,nominal}=250$ nm and $W_{nominal}=W_{2,nominal}=W_{1,nominal}=760$ nm and a length of $L_{sens}=10$ mm.

As mentioned previously, the sensor of the invention is intrinsically athermal and wideband. The only variations which can disturb the symmetry of the sensor of the invention are therefore the height and width variations between the sensitive guide and the reference guide, that is to say local variations within one and the same layer or "wafer" (intra-wafer) from which the reference arm and the sensitive arm are produced.

Now, these variations are correlated in distance terms. In the invention, the distance separating the two arms lies between 50 and 2000 µm. This separation distance along the line x is represented in FIG. 2B by the distance d. Over this distance, the height and width variations are therefore very much smaller than over all of the wafer. It is considered that, for the nominal height and width of the MZI according to the invention, a waveguide is likely to be affected by height and width variations of ±1 nm. These variations will be all the weaker when the two arms are close to one another. Also, in FIG. 3A, the FSR is calculated for height and width variations of ±1 nm affecting the reference arm. The FSR is infinite if the two arms are perfectly identical, hence the omission of the curve of the FSR corresponding to the nominal height $H_{nominal}$ and to the nominal width $W_{nominal}$. At λ=850 nm, the FSR for $H_{nominal}$ and $W_{nominal}$±1 nm is typically 10 times greater than the FSR for $H_{nominal}$±1 nm, hence the omission of the FSRs for $H_{nominal}$ and $W_{nominal}$±1 nm in FIG. 3A. That also means that it is the height which has the greatest influence on the symmetry of the interferometric sensor. Also, FIG. 3A illustrates only the curves 31 and 32 which represent the calculation of the FSR for $W_{nominal}$ and $H_{nominal}+1$ nm and for $W_{nominal}$ and $H_{nominal}-1$ nm respectively.

Conversely, in the non-symmetrical Mach-Zender interferometric sensor of FIG. 1, it is the width and height variations likely to occur in the two guides from one wafer to another which are relevant. In fact, the non-symmetrical MZI of FIG. 1 is athermal and wideband only for a given guide height $H_{nominal}$ and for a given pair of widths $W_1$, $W_2$ of the reference arm and of the sensitive arm satisfying the two equations [Math 3] and [Math 4]. It is therefore the amplitude of the width and height variations from one wafer to another (inter-wafer) which sets the conditions in which the sensor remains athermal and wideband because the amplitude of the inter-wafer variations is greater than the amplitude of the intra-wafer variations. It is considered that, for the nominal height and width of the non-symmetrical MZI, the height and width of the waveguide can vary by ±10 nm. In FIG. 3B, the variations of the FSR are therefore calculated for height and width variations of ±10 nm. The curves 41, 42, 43, 44, 45 represent the calculation of the FSR for, respectively, $H_{nominal}$ and $W_{1,nominale}$, $H_{nominal}$ and $W_{1,nominal}+10$ nm; $H_{nominal}$ and $W_{1,nominal}-10$ nm; $H_{nominal}+10$ nm and $W_{1,nominal}$ and $H_{nominal}-10$ nm and $W_{1,nominal}$.

Take the example of a laser source emitting a radiation $L_{in}$ at a wavelength of between 840 and 860 nm. In order for this source to be compatible with an MZI, whatever the variation of the height and of the width of the waveguides, the spectral width $\Delta\lambda$ of this source will have to be very much lower than the minimum FSR of the MZI in this spectral band, typically 10 times lower. This 840 nm-860 nm spectral range is relevant because a large number of inexpensive lasers emitting at 850 nm are available commercially and their central wavelength is typically accurate to ±10 nm.

FIG. 3A makes it possible to determine that the minimum FSR over the 840 nm-860 nm band is 20 nm (obtained for the curve 32 corresponding to $W_{nominal}$ and $H_{nominal}-1$ nm). Thus, it is necessary to use a source having a spectral width $\Delta\lambda$ less than or equal to 2 nm with the interferometric sensor comprising the photonic integrated circuit of the invention, for the nominal height $H_{nominal}$, the nominal width $W_{nominal}$ and the arm length specified.

Likewise, FIG. 3B makes it possible to determine that the minimum FSR over the 840 nm-860 nm band is 7 nm (obtained for the curve 45 corresponding to $H_{nominal}-10$ nm and $W_{1,nominal}$). Thus, it is necessary to use a source having a spectral width less than or equal to 0.7 nm with the interferometric sensor of the embodiment of FIG. 1, for the nominal height $H_{nominal}$, the nominal width $W_{nominal}$ and the arm length specified, which already exceeds the tolerances of some low-cost single-mode lasers.

The use of a photonic integrated circuit of the invention with an encapsulated reference arm therefore makes it possible to reduce by a factor of 3 the constraint on the spectral width of the radiation emitted by the source relative to the radiation necessary for the non-symmetrical MZI.

It is also observed that, for the MZI of the invention, the FSR varies significantly less with the wavelength than the FSR of the non-symmetrical MZI. That means that the encapsulation of the reference arm makes it possible to use a radiation source that is less accurate with respect to its central wavelength of emission compared to that necessary for a non-symmetrical MZI. That contributes to facilitating the use of the interferometric sensor comprising the photonic integrated circuit of the invention.

Figure 4A:
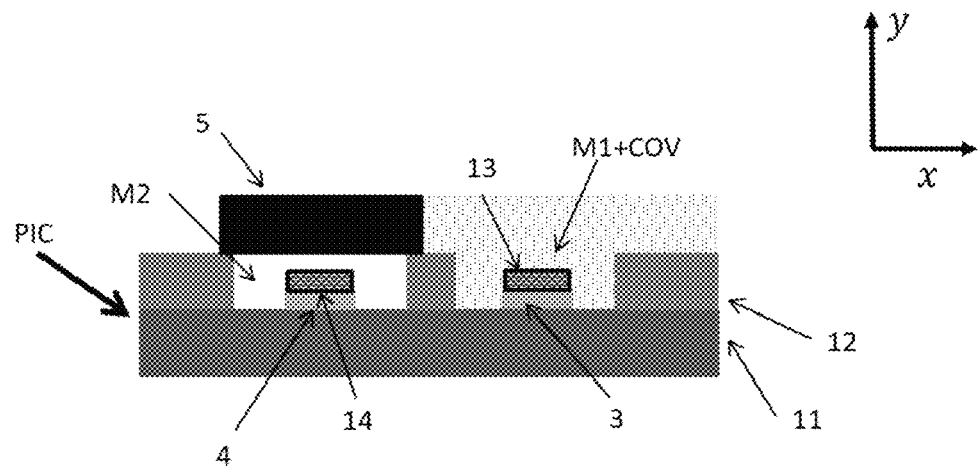
FIG. 4A a schematic profile view of a photonic integrated circuit according to an embodiment of the invention.

FIG. 4A presents a profile view of an embodiment of the invention, in which the photonic integrated circuit comprises a functionalization layer 13 at least partially covering the sensitive arm 3 and a so-called compensation layer 14 at least partially covering the reference arm 4. In fact, the functionalization layer adds a first overthickness. Furthermore, by being suitable for adsorbing one of the compounds to be detected, a strong concentration of this compound produces a pseudo-layer on the surface of the functionalization layer 13, it also being likely to break the symmetry of the MZI of the invention. This compensation layer therefore makes it possible to partially compensate the thickness (or height) variation of the sensitive arm produced by the functionalization and by the adsorption of compounds to be detected. This compensation layer, extremely stable over time, makes it possible to conserve the symmetry of the MZI of the invention.

Figure 4B:
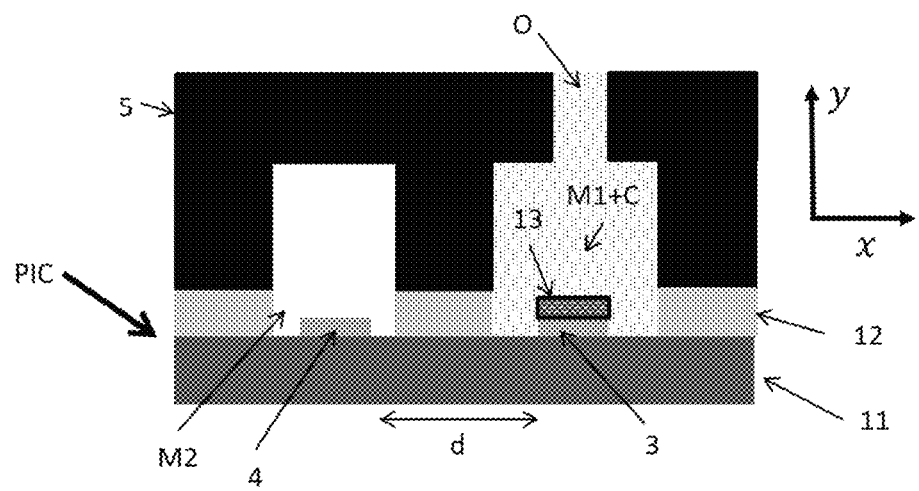
FIG. 4B a schematic profile view of a photonic integrated circuit according to an embodiment of the invention.

FIG. 4B presents a profile view of an embodiment of the invention in which the encapsulation layer 5 is deposited on top of the superstrate 12 while partially covering the sensitive arm 3, said encapsulation layer 5 comprising an aperture O through which the medium M1 and the compounds to be detected C can freely circulate. Thus, the sensitive arm 3 is always exposed to the medium M1 and to the compounds to be detected C.

Figure 5:
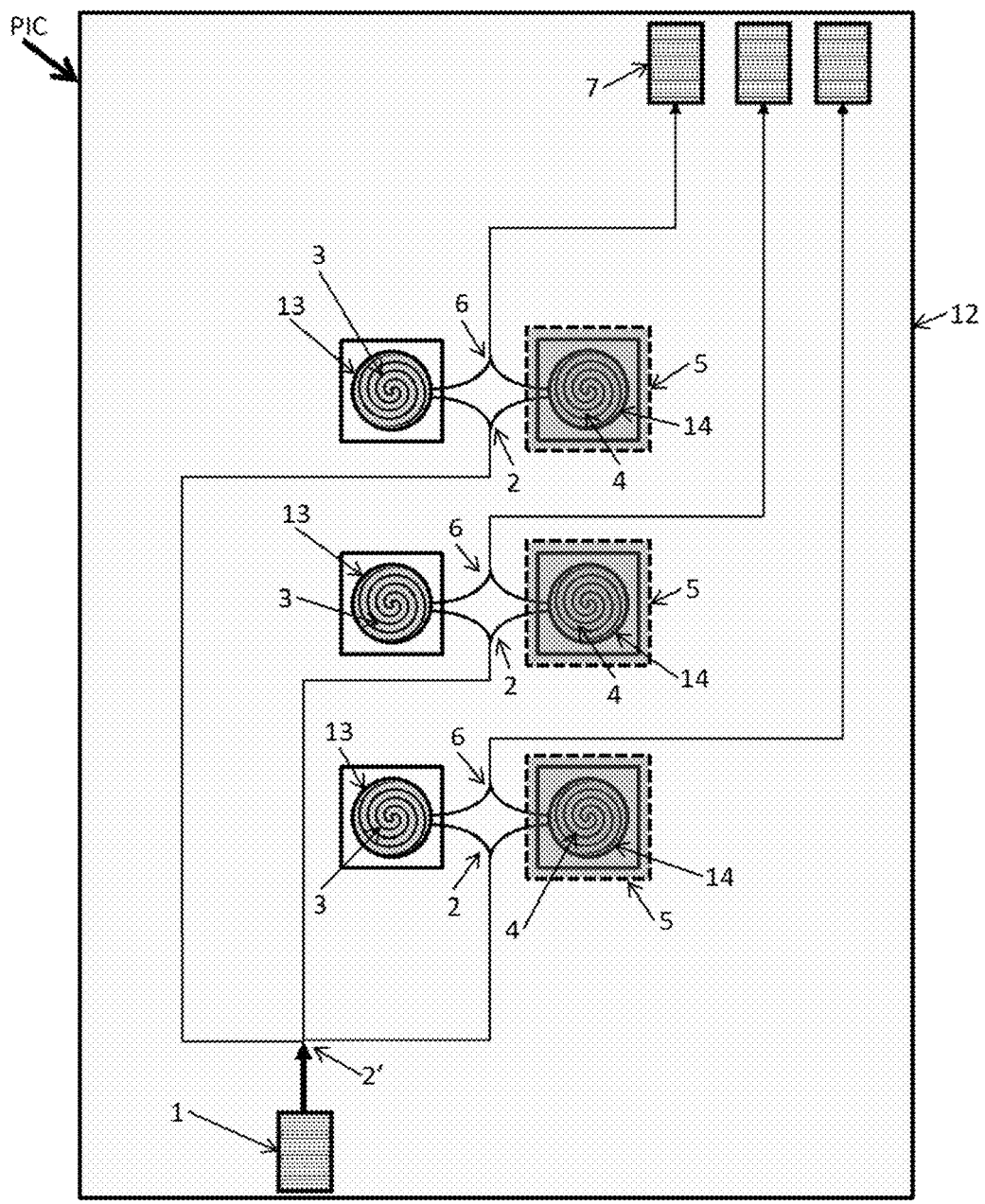
FIG. 5 a schematic plan view of a photonic integrated circuit according to a first variant of the invention.

FIG. 5 represents a plan view of a photonic integrated circuit PIC according to a first variant of the invention. In this first variant, the photonic integrated circuit PIC also comprises at least one additional directional splitter 2' configured to split the light radiation $L_{in}$ coupled by the first coupling means 1 to a plurality of interferometric assemblies. The radiation transmitted by each interferometric assembly is directed to a second coupling means 7 that is different for each interferometric assembly and suitable for coupling said transmitted radiation to a medium external to the photonic integrated circuit PIC.

As an example given in a nonlimiting manner, FIG. 5 represents an integrated circuit PIC of an interferometric sensor comprising three interferometric assemblies.

In this first variant, the sensitive arm of each interferometric assembly comprises a so-called functionalization layer 13 at least partially covering the sensitive arm and suitable for adsorbing one of the compounds to be detected, each functionalization layer being suitable for adsorbing a compound to be detected that is different from those adsorbed by the other functionalization layers covering the sensitive arm of the other interferometric assemblies. These functionalization layers, specific to each interferometric assembly, allow the sensor of the first variant of the invention to detect a plurality of compounds to be detected.

In this first variant of the invention, the encapsulation of the reference arms is done on an individual scale, that is to say that the encapsulation layer of each interferometric assembly deposited on the superstrate is separated from the encapsulation layer of the other interferometric assemblies. Thus, there is no contact between the encapsulation layers 5 of the different interferometric assemblies. In order not to disturb the flow and/or the diffusion of the ambient medium M1 on the sensitive arm of each interferometric assembly, each encapsulation layer has a thickness less than 500 µm. In fact, encapsulation layers that are too thick could result in local disturbances of flow/diffusion of the ambient medium M1 which could locally modify its refractive index. This modification of the refractive index would then cause a phase shift between the radiation guided in the sensitive arm relative to the radiation guided in the reference arm reflected by a measurement noise on the phase shift measured by the sensor, thus reducing the sensitivity of the measurement.

Figure 6:
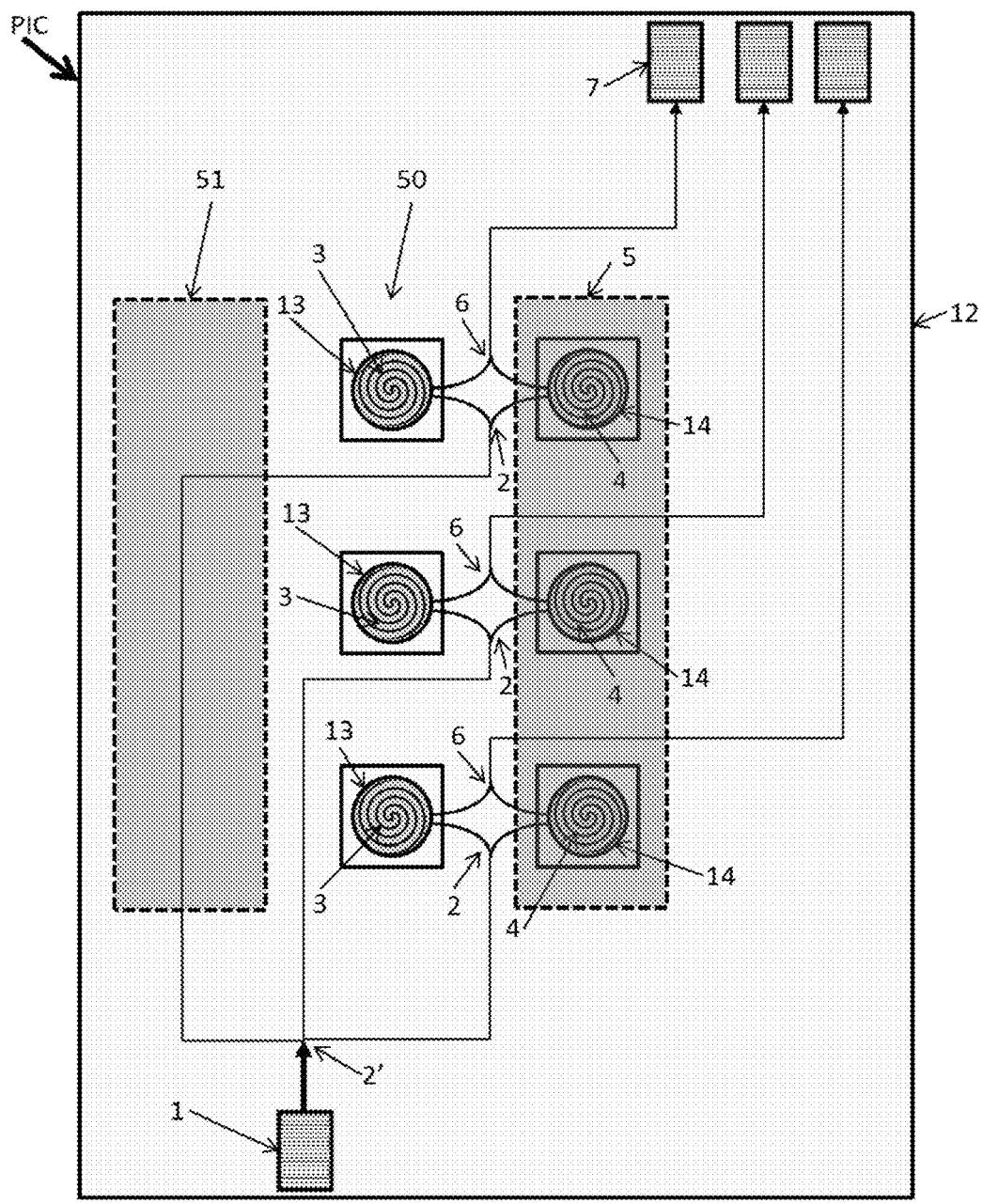
FIG. 6 a schematic plan view of a photonic integrated circuit according to a second variant of the invention.

FIG. 6 represents a plan view of a photonic integrated circuit PIC of an interferometric sensor according to a second variant of the invention. This second variant of the invention is similar to the first variant of the invention illustrated in FIG. 6 except that the encapsulation layer 5 of each reference arm of the interferometric assembly is not separated from the encapsulation layer of the other interferometric assemblies, so as to form an encapsulation layer without discontinuity, simultaneously encapsulating a plurality of interferometric assemblies. In this embodiment, the encapsulation layer seals individual and discontinuous cavities.

Furthermore, in an embodiment of the second variant of the invention that is also represented in FIG. 6, the photonic integrated circuit PIC comprises another additional layer 51, identical to the encapsulation layer 5 and deposited, in the same way as the latter, on top of the superstrate, so as to define a channel 50 within which all the sensitive arms of the interferometric assemblies are located. In this embodiment of the second variant of the invention, the ambient medium M1 to which the sensitive arms of the interferometric assemblies are exposed is a fluid. Thus, the encapsulation layer makes it possible to define a microfluidic channel 50 in which it is possible to control the flow of the ambient medium M1.

In order to define a functional microfluidic channel, the thickness of the encapsulation layer and of the additional layer is between 5 μm and 2000 μm.

It is important to note that, in the second variant of the invention, the additional layer 51 is optional and can be omitted.

The invention claimed is:

1. A photonic integrated circuit (PIC) for interferometric sensor comprising:
   a bottom layer called substrate;
   a first coupling means suitable for coupling an incident light radiation ($L_{in}$) to the photonic integrated circuit (PIC);
   a directional splitter linked to the first coupling means and configured to split the light radiation ($L_{in}$) coupled by the first coupling means to at least one pair of waveguides included in the photonic integrated circuit, each pair of waveguides comprising:
   a first waveguide called sensitive arm wherein a first portion of the light radiation is propagated, said sensitive arm being exposed to a first ambient medium (M1) and to at least one compound to be detected (C) inducing a modification of the local refractive index perceived by the evanescent part of the electromagnetic field of the first portion of the light radiation, and
   a second waveguide called reference arm wherein a second portion of the light radiation is propagated,
   an encapsulation layer encapsulating the reference arm, said encapsulation layer being impermeable to the compound or compounds to be detected (C), so that the reference arm is exposed only to a second ambient medium (M2), substantially of the same nature as the first ambient medium (M1) and without said compound to be detected,
   a directional combiner combining the first portion of the light radiation from said reference arm, called first transmitted portion, and the second portion of the light radiation from said sensitive arm, called second transmitted portion, to form a transmitted radiation;
   a second coupling means suitable for coupling said transmitted radiation to a medium external to the photonic integrated circuit (PIC);
   a top layer called superstrate covering at least the first and the second coupling means, the directional splitter and the directional combiner and not covering the sensitive arm and the reference arm, said encapsulation layer being deposited on top of the superstrate.

2. The photonic integrated circuit according to claim 1, wherein the sensitive arm and reference arm are spiral-form waveguides.

3. The photonic integrated circuit according to claim 1, comprising a so-called functionalization layer at least partially covering the sensitive arm and suitable for adsorbing one of the compounds to be detected.

4. The photonic integrated circuit according to claim 3, comprising a so-called compensation layer at least partially covering the reference arm, a thickness of the compensation layer being equal to or greater than that of the functionalization layer before adsorption of said compound to be detected.

5. The photonic integrated circuit according to claim 1, wherein the encapsulation layer is porous to the first ambient medium so as to allow a regulation of the relative humidity or of the osmotic pressure of the second ambient medium (M2) relative to the first ambient medium (M1).

6. The photonic integrated circuit according to claim 1, wherein the encapsulation layer is made of glass, or silicon, polymer or metal.

7. The photonic integrated circuit according to claim 1, wherein the encapsulation layer is a deformable membrane.

8. The photonic integrated circuit according to claim 1, wherein an assembly formed by said directional splitter, said reference arm, said encapsulation layer, said sensitive arm and said directional combiner is called interferometric assembly, said photonic integrated circuit comprising a plurality of said interferometric assemblies, at least one additional directional splitter configured to split the light radiation coupled by the first coupling means to a plurality of interferometric assemblies, and a plurality of second coupling means, each suitable for coupling the radiation transmitted by a different interferometric assembly to a medium external to the photonic integrated circuit (PIC).

9. The photonic integrated circuit according to claim 8, wherein the sensitive arm of each interferometric assembly comprises a so-called functionalization layer at least partially covering the sensitive arm and suitable for adsorbing one of the components to be detected, each functionalization layer being suitable for adsorbing a compound to be detected different from those adsorbed by the other functionalization layers covering the sensitive arm of the other interferometric assemblies.

10. The photonic integrated circuit according to claim 8, wherein the reference arm of each interferometric assembly is individually encapsulated.

11. The photonic integrated circuit according to claim 10, wherein the thickness of the individual encapsulation layer is less than 500 microns.

12. The photonic integrated circuit according to claim 8, wherein the reference arms of the interferometric assemblies are collectively encapsulated, so as to form an encapsulation layer that is uniform and without discontinuity.

13. The photonic integrated circuit according to claim 12, wherein the thickness of the uniform encapsulation layer is between 5 and 2000 microns.

14. An interferometric sensor comprising:
  a laser source configured to emit an incident light radiation ($L_{in}$);
  a photonic integrated circuit according to claim 1;
  an optical detection system suitable for detecting a light radiation ($L_{out}$) from the second coupling means and generating a signal (S) representative of the trend over time of the detected light intensity;
  a processing unit for processing said signal, suitable for determining, from the detected intensity, the trend over time of the phase-shift between the first transmitted portion and the second transmitted portion.

* * * * *